United States Patent [19]
Kawaguchi

[11] Patent Number: 5,634,772
[45] Date of Patent: Jun. 3, 1997

[54] SYSTEM FOR CONTROLLING OPERATION OF TURBO TYPE FLUID MACHINERY

[75] Inventor: Kyoji Kawaguchi, Kanagawa-ken, Japan

[73] Assignee: Ebara Corporation, Tokyo, Japan

[21] Appl. No.: 691,414

[22] Filed: Aug. 2, 1996

Related U.S. Application Data

[63] Continuation of Ser. No. 325,816, Oct. 19, 1994, abandoned.

[30] Foreign Application Priority Data

Oct. 21, 1993 [JP] Japan ................................ 5-285770

[51] Int. Cl.⁶ .................................................. F04B 49/00
[52] U.S. Cl. ........................... 417/22; 417/34; 417/44.2; 417/53
[58] Field of Search ....................... 417/22, 44.2, 45, 417/53, 34, 42

[56] References Cited

U.S. PATENT DOCUMENTS

| | | | |
|---|---|---|---|
| 3,832,846 | 9/1974 | Leeson | 60/39.281 |
| 3,985,467 | 10/1976 | Lefferson | 417/22 |
| 4,678,404 | 7/1987 | Lorett et al. | |
| 5,019,757 | 5/1991 | Beifus | |
| 5,159,218 | 10/1992 | Murry et al. | 310/68 B |
| 5,160,244 | 11/1992 | Kuwabara et al. | 417/22 |
| 5,240,380 | 8/1993 | Mabe | |

FOREIGN PATENT DOCUMENTS

| | | | |
|---|---|---|---|
| 0100390 | 2/1984 | European Pat. Off. | |
| 57-52396 | 3/1982 | Japan | |
| 57-113992 | 10/1982 | Japan | |
| 59-44997 | 3/1984 | Japan | |
| 59-044997 | 6/1984 | Japan | |
| 61-187593 | 8/1986 | Japan | |
| 402223688A | 9/1990 | Japan | 417/44.2 |
| 5-9639 | 5/1993 | Japan | |

*Primary Examiner*—Timothy Thorpe
*Assistant Examiner*—Xuan M. Thai
*Attorney, Agent, or Firm*—Armstrong, Westerman, Hattori, McLeland & Naughton

[57] ABSTRACT

A system for controlling the operation of a turbo-type fluid machine driven by a variable speed prime mover, which enables the characteristics of the fluid machine to be improved so as to become favorable for actual use while allowing the prime mover to exhibit its capacity to the maximum even at an operating point other than the rated point. The operation control system includes a turbo-type fluid machine driven by a driving machine, and a device for detecting an operating head or operating pressure of the fluid machine. The operation control system further includes a device for arithmetically outputting a rotational speed which gives a preset characteristic of the fluid machine in corresponding relation to the operating head or operating pressure, and a device for changing the rotational speed of the driving machine in response to the output rotational speed, so that even when the operating head or operating pressure of the fluid machine changes, the rotational speed of the fluid machine is controlled so as to maintain the preset characteristic of the fluid machine.

7 Claims, 13 Drawing Sheets

SYSTEM FOR CONTROLLING OPERATION OF TURBO TYPE FLUID MACHINERY

This application is a continuation of application Ser. No. 08/325,816 filed Oct. 19, 1994, now abandoned.

BACKGROUND OF THE INVENTION

1. Field of the Invention

The present invention relates to a system for controlling the operation of a turbo-type fluid machine. More particularly, the present invention relates to a turbo type fluid machine operation control system which enables a turbo machine, e.g., a pump, a blower, etc., to exhibit favorable performance characteristics in conformity to each particular purpose of use.

2. Description of the Related Art

To control the output of a turbo-type fluid machine, e.g., a pump, a blower, etc., a technique whereby the rotational speed of a driving machine for the turbo machine is varied has been widely employed. According to a conventional method of controlling the output of a turbo machine by the rotational speed control, the rotational speed is varied so that the head or pressure produced by the turbo machine or the capacity (i.e., discharge quantity) thereof complies with the demand therefor, thereby controlling the characteristics of the fluid machine. That is, in automatic control, the rotational speed is feedback-controlled on the basis of the result of a comparison between the value of the detected quantity, e.g., the discharge pressure, capacity, etc., on the demand side and the corresponding set value.

For example, to change the characteristics of a turbo type fluid machine that is driven by an internal combustion engine or other driving machine, such a method has been put to practical use whereby the fuel feed is controlled by a speed governor to thereby control the rotational speed of the driving machine. To set a rotational speed, a signal is manually or automatically given to the speed governor according to the required discharge pressure or capacity of the fluid machine. However, no method has been known whereby a pump and/or a driving machine therefor is allowed to exhibit its capacity to the maximum in accordance with the operating conditions, as is demanded for a drainage pump or the like, except for constant-speed shaft power control that is carried out by employing adjustable vanes incorporated in the pump. It should be noted that when adjustable vanes are employed, a complicated mechanism is needed to adjust the angle of the vanes. Therefore, the constant-speed shaft power control is disadvantageous in general-purpose applications.

For a pump that is driven by an induction motor, a method has heretofore been put to practical use wherein, in order to change pump characteristics in accordance with the operating conditions and load conditions, the frequency of the power supply for the motor is changed by the use of a static invertor, thereby controlling the rotational speed. In this regard, for example, Japanese Patent Application Public Disclosure (KOKAI) Nos. 57-52396 and 59-44997 disclose a method wherein the invertor is controlled so that the operating efficiency of the motor is maximized. Japanese Patent Application Public Disclosure (KOKAI) No. 59-25099 discloses a control method wherein the motor output is maintained at the rated value by an invertor. Japanese Patent Application Post-Examination Publication No. 57-113992 discloses a method wherein a rotational speed that gives a target pressure is arithmetically obtained to control the speed of a pump.

However, none of these conventional techniques intend to positively improve the performance characteristics of a turbo-type fluid machine so that the characteristics become favorable for actual use while allowing the combination unit of the fluid machine and a driving machine therefor to exhibit its capacity to the full.

As is generally known, when high specific speed turbo-type fluid machines are operated at constant speed, the required power decreases as the operating head or pressure decreases and the capacity increases. Particularly, when the capacity is above the rated value, the required power markedly decreases as the operating head or pressure decreases. That is, in this operating region, the allowance for the capability of the driving machine increases; therefore, the capacity of the driving machine cannot fully be exhibited. Further, in these fluid machines, the required power increases when the capacity is below the rated value. Therefore, in a case where the machine is expected to operate in this region, sufficient allowance must be given to the rated output of the driving machine in order to avoid overloading of the driving machine.

In the case of low specific speed turbo-type fluid machines, on the other hand, when a constant-speed operation is performed, the capacity decreases as the operating head or pressure increases, and the required power also decreases. That is, in this operating region, the allowance for the capability of the driving machine increases; therefore, the capacity of the driving machine cannot fully be exhibited. Further, in these fluid machines, the required power increases when the capacity is above the rated value. Therefore, it is necessary to give allowance to the rated output of the driving machine. Further, in the case of a low specific speed fluid machine in which the head (pressure)-capacity curve is flat, the capacity varies to a considerable extent with a change in the operating head or pressure, so that a problem is likely to arise in receiving systems or processes at the downstream side. Accordingly, it is necessary to limit the capacity by discharge valve throttling control or other similar controls.

Further, the pressure-capacity curve assumes a convex shape with a maximum value in a small capacity region as is observed in a centrifugal blower or the like. Therefore, the operational range is limited to the capacity region above the capacity value at which the pressure reaches a maximum in order to avoid surging.

SUMMARY OF THE INVENTION

In view of the above-described problems of the conventional techniques, it is an object of the present invention to provide a fluid machine operation control system which enables the characteristics of a conventional turbo-type fluid machine to be improved so as to become favorable for actual use.

The present invention provides a turbo-type fluid machine operation control system including a turbo-type fluid machine driven by a driving machine, and a device for detecting an operating head or operating pressure of the fluid machine. The operation control system further includes a device for arithmetically outputting a rotational speed which gives a preset characteristic of the fluid machine in corresponding relation to the operating head or operating pressure, and a device for changing the rotational speed of the driving machine in response to the output rotational speed, so that even when the operating head or operating pressure of the fluid machine changes, the rotational speed of the fluid machine is controlled so as to maintain the preset characteristic of the fluid machine.

In response to a change in the operating head or operating pressure of the turbo-type fluid machine, a rotational speed signal that gives a preset performance characteristic of the fluid machine is input to a speed governor or rotational speed controller for the driving machine to control the rotational speed thereof. Accordingly, favorable performance characteristics can be maintained at all times irrespective of a change in the operating head or pressure.

If the rotational speed is controlled so that a constant torque, as the above-described preset performance characteristic, is maintained at all times irrespective of change in the operating head or pressure it is generally possible to realize characteristics favorable for actual use while utilizing the capacity of the prime mover to the full. That is, in the case of a high specific speed fluid machine, when the operating head or pressure is below the rated value, the rotational speed increases, and the capacity increases. On the other hand, in a low capacity region where the operating head or pressure is above the rated value, the rotational speed decreases, and the required power decreases. Therefore, overloading of the driving machine can be avoided. In the case of a low specific speed fluid machine, when it is operated at a head or pressure higher than the rated value, the rotational speed increases to reduce the decrease in the capacity. When the head or pressure is lower than the rated value, the rotational speed decreases to prevent excessive increase in the capacity. Thus, it is possible to avoid overloading of the driving machine.

In addition, it is possible to realize performance characteristics favorable for actual use by setting a curve with a desired slope which represents the relationship between the operating head or pressure and the capacity of the fluid machine, and giving a rotational speed signal corresponding to the operating head or pressure.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DESCRIPTION OF PREFERRED EMBODIMENTS

Embodiments of the present invention will be described below with reference to the accompanying drawings.

FIGS. 1 to 8 show a first embodiment of the present invention.

Figure 1:
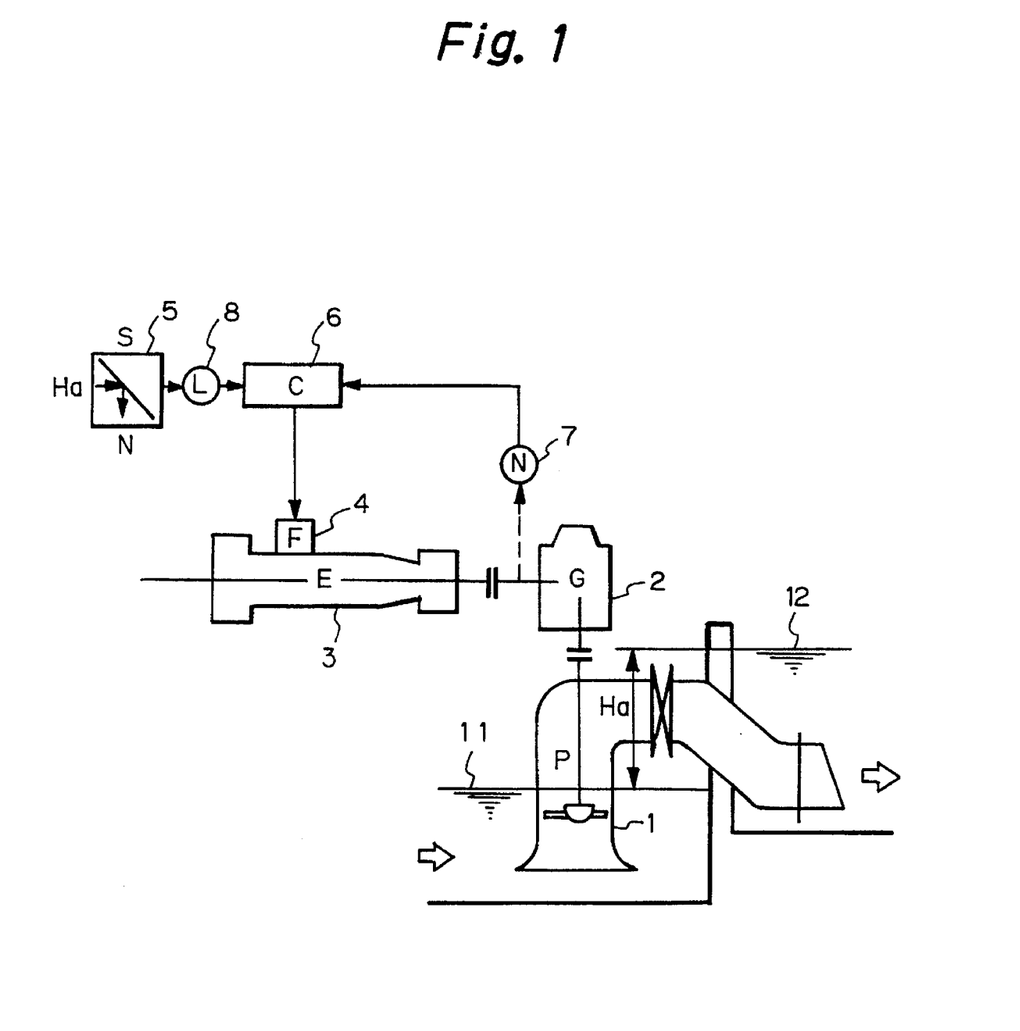
FIG. 1 illustrates the arrangement of a first embodiment of the operation control system according to the present invention.

FIG. 1 illustrates the basic arrangement of a first embodiment of the operation control system according to the present invention in which the invention is applied to a turbo-type drainage pump. The drainage pump 1 is a turbo-type high specific speed pump, i.e., an axial flow pump or a mixed flow pump, which is used for a relatively large capacity and a low pump head. The pump 1 is driven by a driving machine 3 via a speed reducer 2. The driving machine 3 may be an internal combustion engine, a gas turbine, or a steam turbine. The driving machine 3 has speed governor 4 for controlling the speed of rotation of the driving machine 3. An actual pump head (Ha), which is a difference between the external liquid level 12 at the discharge side of the pump 1 and the internal liquid level 11 at the suction side of the pump 1, is measured by a liquid level gauge (not shown). A function generator 5 is an arithmetic device for outputting a rotational speed n which gives a constant torque in corresponding relation to the operating head Ha of the pump 1. A rotational speed detector 7 is a device for detecting the rotational speed of the rotating shaft of the driving machine 3 and for outputting it in the form of an electrical signal. A comparator amplifier 6 makes a comparison between the rotational speed signal detected by the rotational speed detector 7 and the rotational speed signal corresponding to the operating head, which is output from the function generator 5, and outputs deviation of the former rotational speed signal from the latter rotational speed signal to the speed governor 4.

The operation of the first embodiment will be explained below. The function generator 5 is fed with a signal indicative of the actual pump head Ha from the liquid level gauge (not shown) and outputs a signal indicative of a rotational speed n that gives a constant torque for the pump. The comparator amplifier 6 is fed with a signal from the rotational speed detector 7 that corresponds to the actual rotational speed of the pump 1 to compare it with the signal indicative of the rotational speed n, which is output from the function generator 5. Deviation of the actual rotational speed from the rotational speed n, which is determined by the comparator amplifier 6, is input to the speed governor 4. The speed governor 4 controls the fuel feed rate according to the deviation, thereby varying the speed of the driving machine 3.

Accordingly, when the internal liquid level 11 rises and consequently the actual pump head Ha decreases, the rotational speed signal n from the function generator 5 increases in accordance with the corresponding actual pump head Ha so that the torque is maintained at a constant level. The comparator amplifier 6 detects deviation of the actual rotational speed from the rotational speed n, and the speed governor 4 increases the fuel feed rate according to the deviation, thereby increasing the rotational speed of the driving machine 3 to the required value. Conversely, when the difference between the internal and external liquid levels 11 and 12, that is, the actual pump head Ha, increases, the function generator 5 outputs a signal for reducing the rotational speed so that the torque is maintained at a constant level. The comparator amplifier 6 compares the signal which is output from the function generator 5 with the signal which is output from the rotational speed detector 7, and the speed governor 4 reduces the output of the driving machine 3 according to the result of the comparison, thereby lowering the rotational speed to the required value.

The action and effect of the operation control wherein the torque is maintained at a constant level by varying the rotational speed of the driving machine will be explained below in detail.

With regard to the capacity of internal combustion engines, the torque (T) remains substantially constant within an actual service range irrespective of change in the rotational speed (N). If control is effected so that the torque is held constant, the output (Lp) changes in proportion to the rotational speed (N), which may be expressed by $Lp=KTN$ (where K is a constant). Accordingly, if the rotational speed of the driving machine is controlled so that the torque is maintained at a constant level irrespective of the operating head or discharge of the pump, it becomes possible to operate the pump with the capacity of the driving machine utilized to the full. That is, such a favorable pump operation can be realized by giving the speed governor a rotational speed signal that gives a constant torque in corresponding relation to the operating head or capacity of the pump.

According to the known affinity laws for turbo pumps, with the same liquid to be pumped, the following relationship holds between the pump capacity, pump head, torque and shaft power on the one hand and the rotational speed on the other:

$$Q'/Q=N'/N,\ H'/H=T'/T=(N'/N)^2,\ Lp'/Lp=(N'/N)^3 \quad (1)$$

where Q and Q' are capacities at rotational speeds N and N', respectively; H and H' are pump heads at N and N', respectively; T and T' are torques at N and N', respectively; and Lp and Lp' are shaft powers at N and N', respectively.

A group of relationship curves can be drawn with regard to rotational speeds below and above the rated point according to the equation (1) on the basis of known relationship curves of the pump head and shaft power relative to the capacity at the rated speed. It is possible to obtain a rotational speed on the group of curves that satisfies the rated point and yet satisfies the relationship to any pump head or torque or shaft power at capacities below and above the rated point. The operation control system of the present invention is realized by setting in the function generator a relationship between the operating head and the rotational speed which gives the above-described characteristics in corresponding relation to the operating head.

Figure 2:
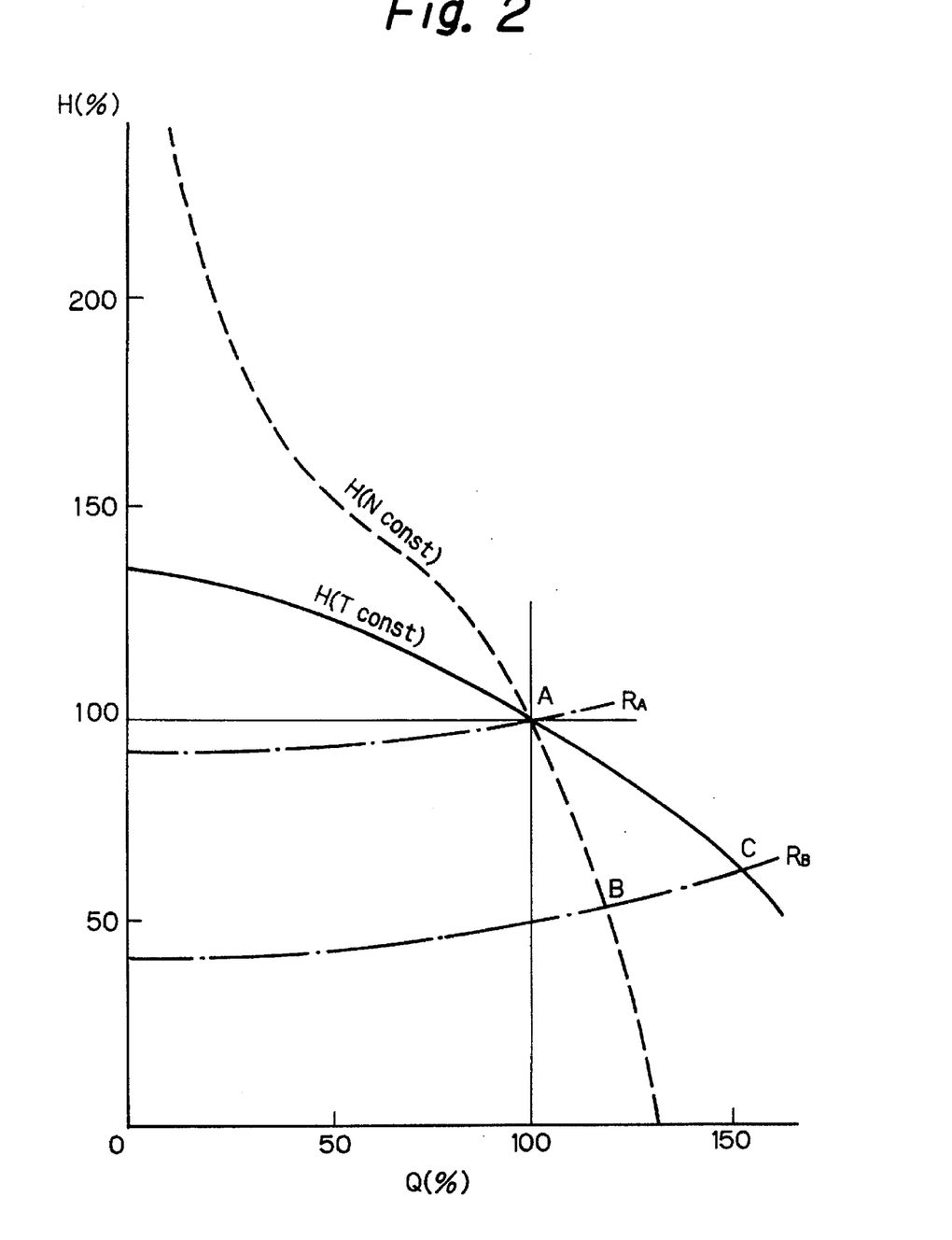
FIG. 2 is a graph showing the relationship between the capacity Q and head H of a pump.
Figure 3:
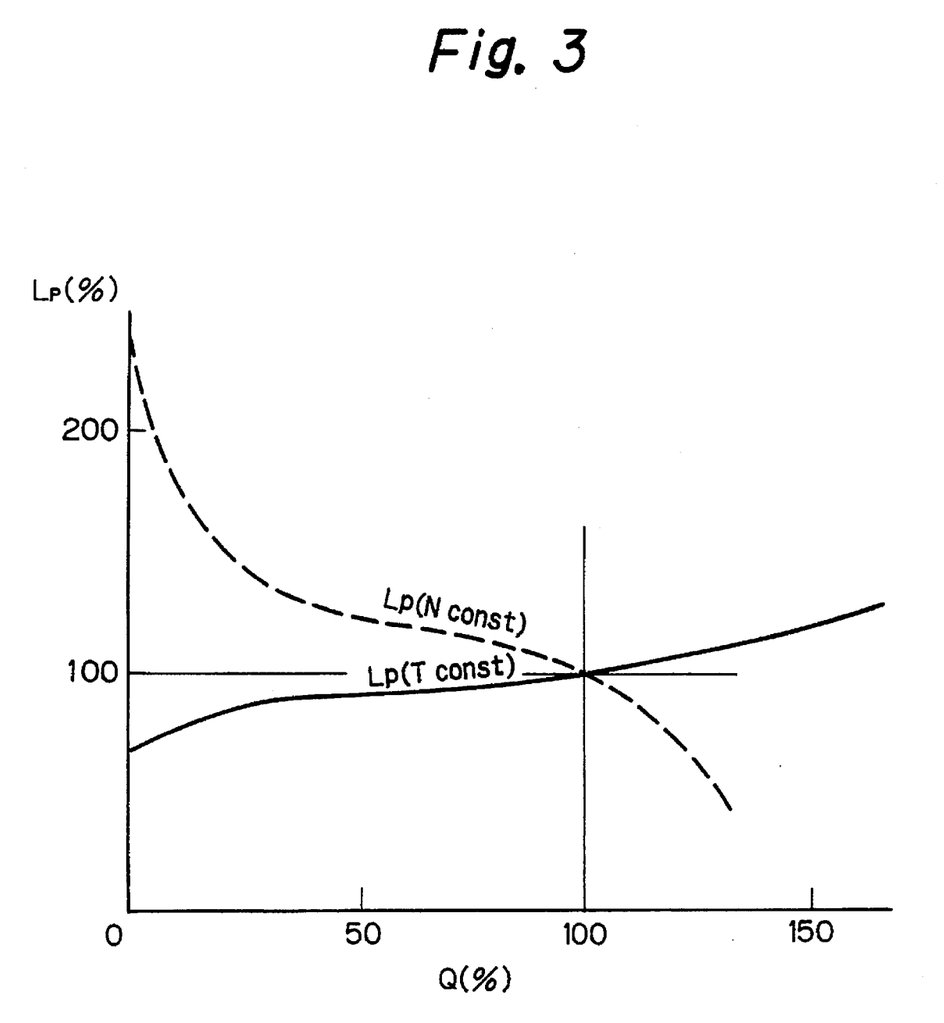
FIG. 3 is a graph showing the relationship between the capacity Q and shaft power Lp of the pump.

FIGS. 2 and 3 respectively show the relationships between the pump head H and the capacity Q and between the power Lp and the capacity Q. The dotted lines H (N const.), Lp (N const.) show the relationships in the conventional operation in which the rotational speed is maintained at a constant value. The solid lines H (T const.), Lp (T const.) show the relationships in the first embodiment of the present invention, in which the rotational speed of the driving machine is varied with the torque maintained at a constant value. That is, the rotational speed is reduced in a small discharge region below the rated capacity (100%), where the shaft power increases, whereas in a discharge region above the rated capacity, the rotational speed is increased because the shaft power decreases in this region, thus maintaining the torque at the value of the rated point over the entire range.

Figure 4:
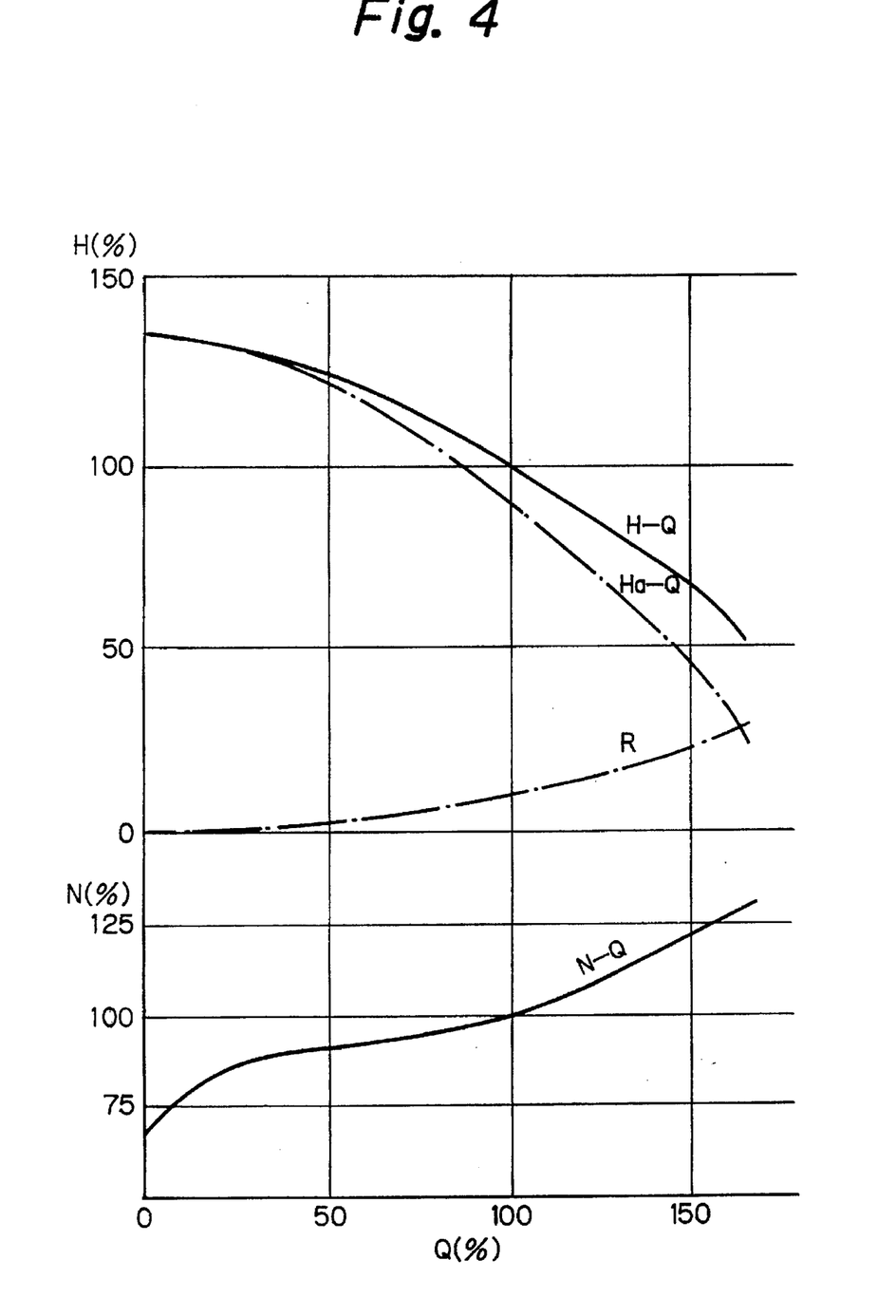
FIG. 4 is a graph showing the relationship between the operating head H of the pump and the rotational speed N that gives a constant torque.

In a case where the torque is maintained at a constant value, since the rotational speed N is proportional to the shaft power Lp, the relationship of the rotational speed N to the capacity Q, which is given by the operating head, is such as that shown by the curve N-Q in FIG. 4. That is, when an operating head of the pump is determined, a rotational speed N that gives a constant torque is uniquely determined.

The operating head of a drainage pump or other similar pump is given as the sum H of the difference between the internal and external liquid levels, that is, the actual head Ha, and the loss R of head in the piping in front of and behind the pump. As is generally known, the piping loss R varies in proportion to the square of the capacity Q. Therefore, it can be expressed as a system head curve R shown in FIG. 4 based on the value at the rated capacity. By subtracting the piping loss R at each capacity Q from the pump head curve H, the relationship between the actual head Ha and the capacity Q can be obtained as the Ha-Q curve, which is shown by the dot-dash line in FIG. 4.

Figure 5:
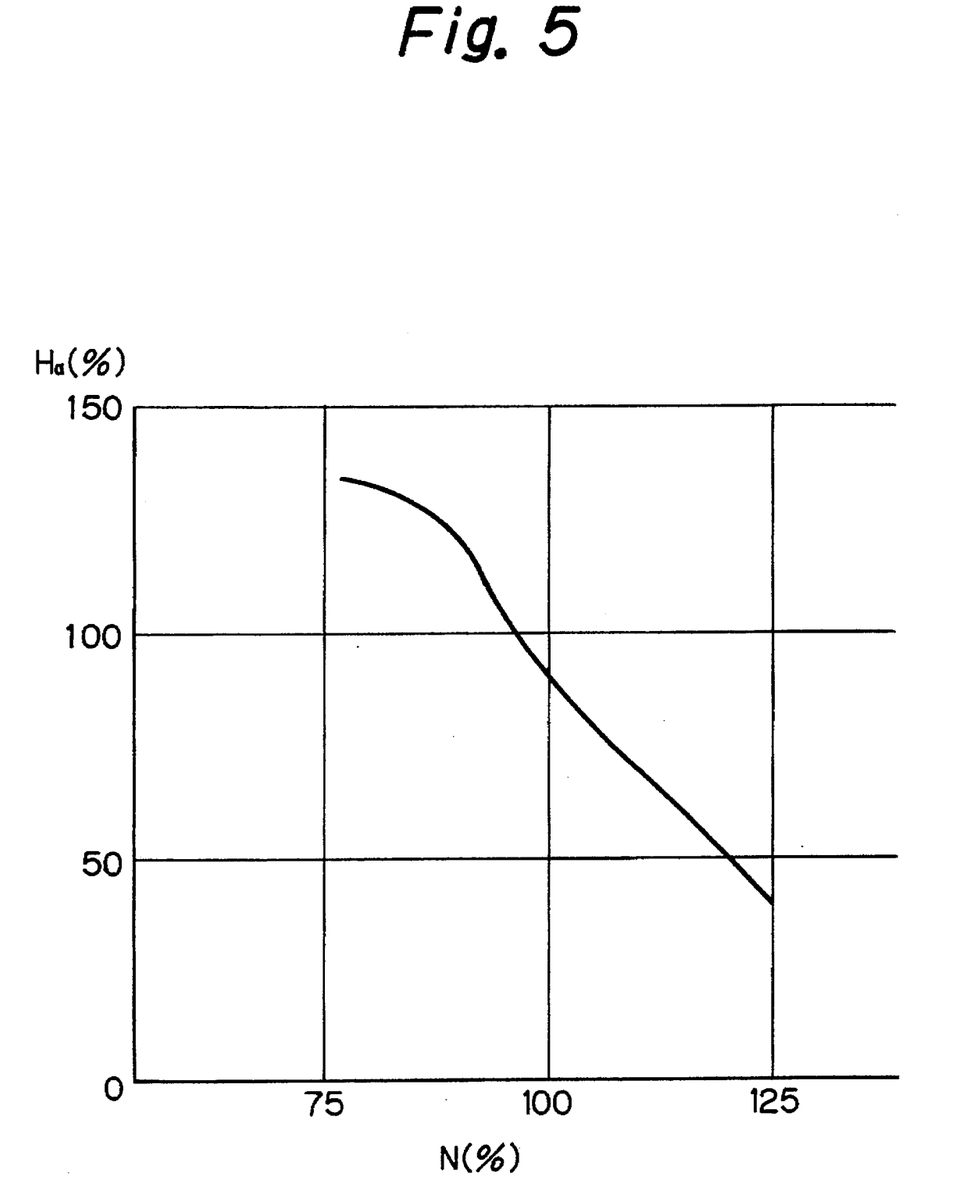
FIG. 5 is a graph showing the relationship between the actual pump head Ha and the set rotational speed N.

Accordingly, the relationship between the actual pump head Ha, which can be readily measured with a liquid level gauge in general, and the rotational speed N that gives a constant torque is expressed by the curve shown in FIG. 5, which is obtained from the curves shown in FIG. 4.

A rotational speed that gives a constant torque, which is determined from the readily measurable actual head through the use of the relationship shown in FIG. 5, is set in the function generator 5, and the set value of the rotational speed and the detected value from the rotational speed detector 7 are input to the comparator amplifier 6, where deviation of the detected value from the set value is obtained. Then, a speed increasing or reducing signal corresponding to the deviation is given to the speed governor 4, thereby enabling the pump to be operated with a constant torque irrespective of change in the operating head of the pump. It is also possible to operate the pump with a desired torque by changing the setting of a function of the relation between the actual head and the rotational speed.

With the above-described operation control, in which the torque is maintained at a constant value, the high specific speed pump 1 can be favorably operated as follows: In a discharge region above the rated capacity, the rotational speed N rises, and the capacity Q increases to a considerable extent. In a small discharge region, on the other hand, the rotational speed N decreases, so that it is possible to avoid overloading of the driving machine 3. In addition, the pump operation can be started or stopped with the discharge valve fully closed. Thus, it is possible to avoid a rapid change in the capacity at the time of starting or stopping the pump operation.

High specific speed pumps are generally employed as drainage pumps or other similar pumps which are used for a relatively low operating head. In these pumps, the operating head varies to a considerable extent according to the difference between the internal and external liquid levels.

According to the present invention, since the slope of the pump head (H-Q) curve becomes flat, the capacity increases when the pump head is low, that is, when the internal liquid level is high, thereby enabling the time required for drainage to be shortened. In FIG. 2, the dot-dash line $R_A$ shows a system head curve when the pump head is at the rated value, and $R_B$ a system head curve when the pump head is low. That is, the operating point B in the case of a pump operated at the constant speed shifts to the point C. Thus, it is possible to realize a marked increase in the drainage capacity.

However, there is a problem in that as the actual head Ha decreases, the rotational speed N becomes excessively high. In order to avoid an excessive capacity when the pump head is low, or to protect the prime mover against the maximum rated output, an upper limit is provided for the set value of rotational speed, thereby making it possible to avoid trouble in operation. For this purpose, a rotational speed upper limit setting device 8 is inserted in the feedback loop to limit the rotational speed of the driving machine 3 and the pump 1 within a predetermined value.

Figure 6:
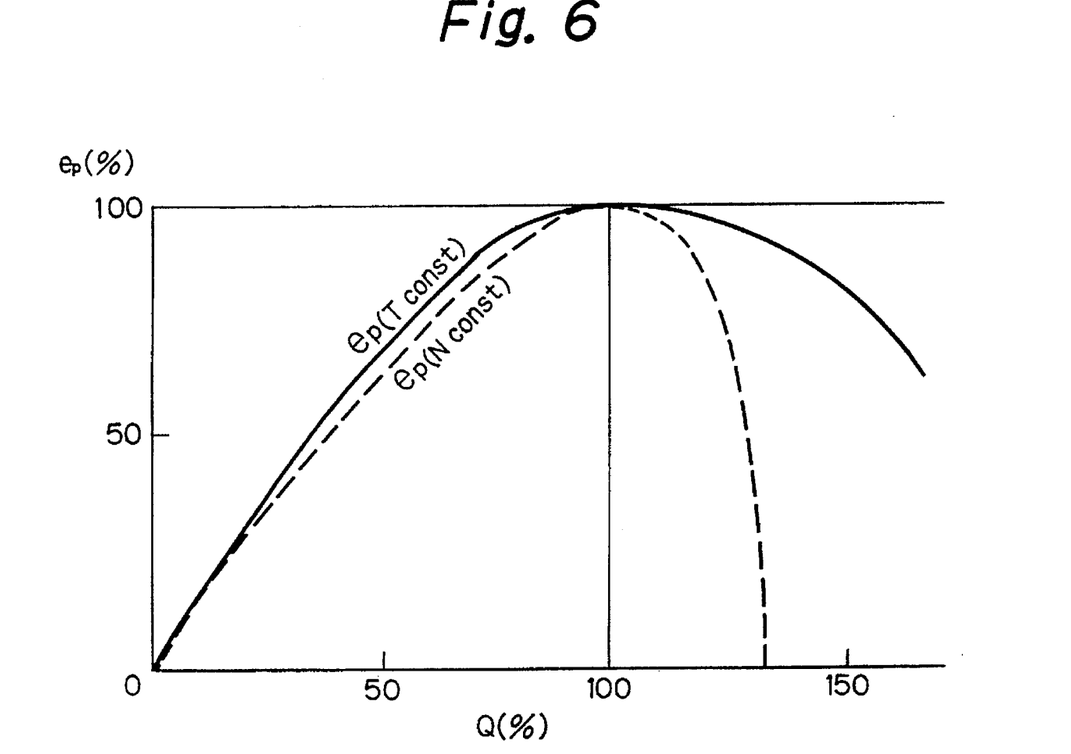
FIG. 6 is a graph showing the relationship between the capacity Q and efficiency ep of the pump.
Figure 7:
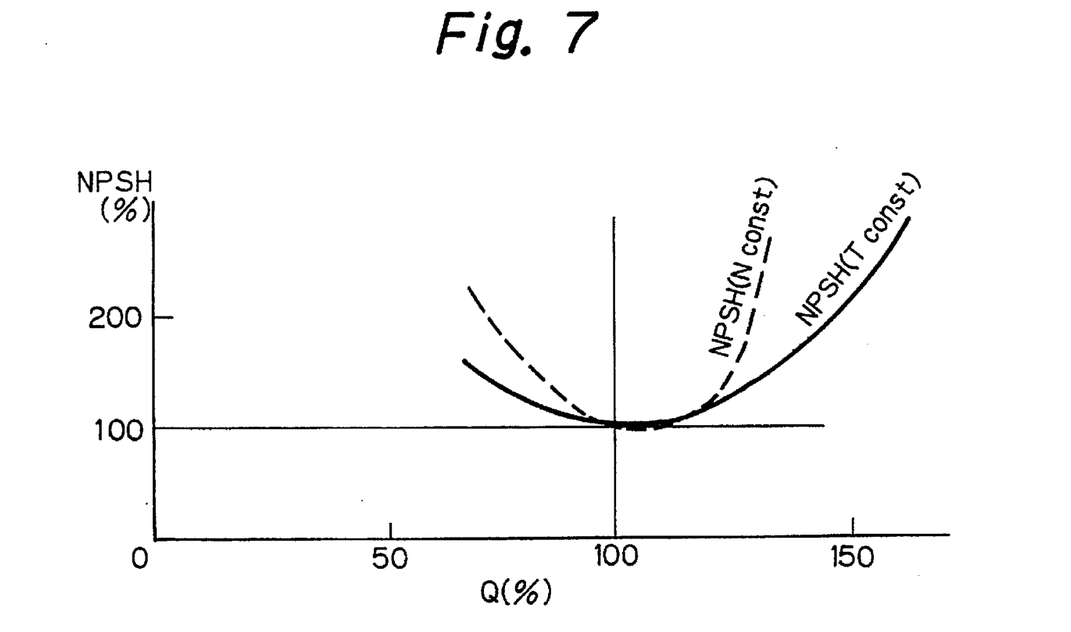
FIG. 7 is a graph showing the relationship between the capacity Q and required NPSH of the pump.

FIGS. 6 and 7 respectively show the relationships between the pump efficiency $e_P$ and the capacity Q and between the required NPSH (Net Positive Suction Head) and the capacity Q with the value at the rated point being defined as 100%. In the case of this embodiment, shown by the solid line, the roundness of the pump efficiency curve is prominent in comparison to the pump efficiency curve in the case of the constant-speed operation, which is shown by the dotted line. Particularly, there is a marked improvement in the efficiency $e_P$ when the capacity Q is large. In other words, an energy-saving operation is realized. The value of the required NPSH of a high specific speed pump increases below and above the rated capacity. In the case of this embodiment, however, the capacity Q that gives the minimum value of NPSH shifts together with the rotational speed N. Therefore, the rate at which the required NPSH increases at capacities below and above the rated value is relatively low; this is advantageous from the viewpoint of installing or operating the pump.

Figure 8:
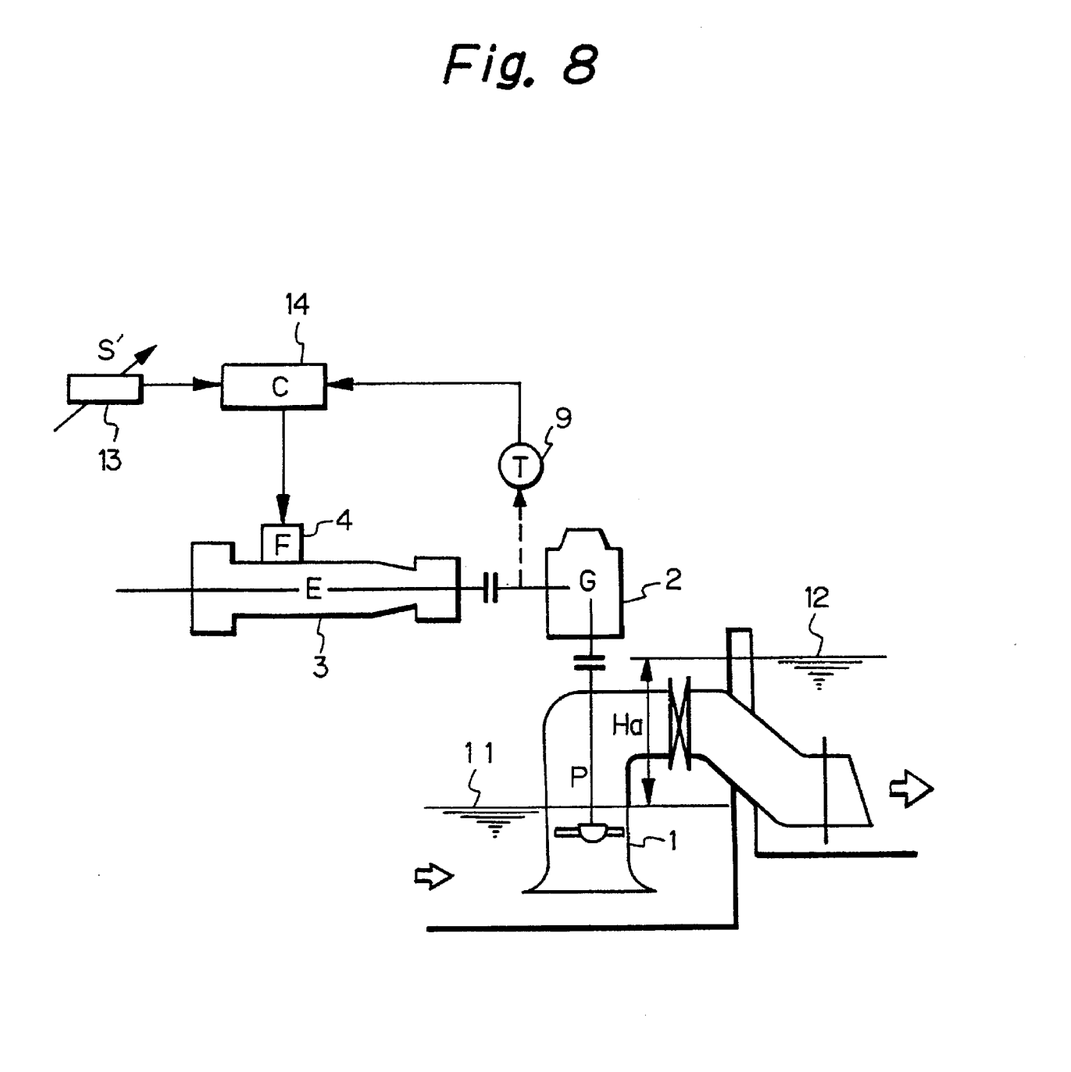
FIG. 8 illustrates the arrangement of another embodiment of the operation control system according to the present invention.

FIG. 8 shows another embodiment of the pump operation control system according to the present invention, in which the rotational speed is varied with the torque maintained at a constant level. The basic arrangement of this embodiment is the same as that shown in FIG. 1. Constituent elements of the arrangement shown in FIG. 8 which have the same functions as those in the first embodiment are denoted by the same reference numerals, and description thereof is omitted. A torque detector 9 detects the torque output from the rotating shaft of the driving machine 3. The detected torque is compared in a comparator amplifier 14 with a torque set in a torque setting device 13. When the detected torque is different from the set value, the speed governor 4 varies the fuel feed rate according to the deviation of the detected torque from the set value, thereby changing the speed of rotation, and thus effecting control so that the torque reaches a preset constant value. In this embodiment also, the rotational speed of the pump is controlled so that the torque is maintained at a constant level. Therefore, the operation and advantageous effects of the control system are the same as those in the above-described embodiment.

In the foregoing embodiments, an internal combustion engine, a gas turbine, or a steam turbine is employed as the driving machine 3. However, it is also possible to employ an electric motor as the driving machine 3, as a matter of course. In such a case, the rotational speed of the pump can be controlled so that the torque is maintained at a constant level by driving an induction motor by the use of a rotational speed controller, e.g., a frequency-voltage converter (static invertor), in place of the speed governor 4.

FIGS. 9 to 12 show a second embodiment of the present invention.

Figure 9:
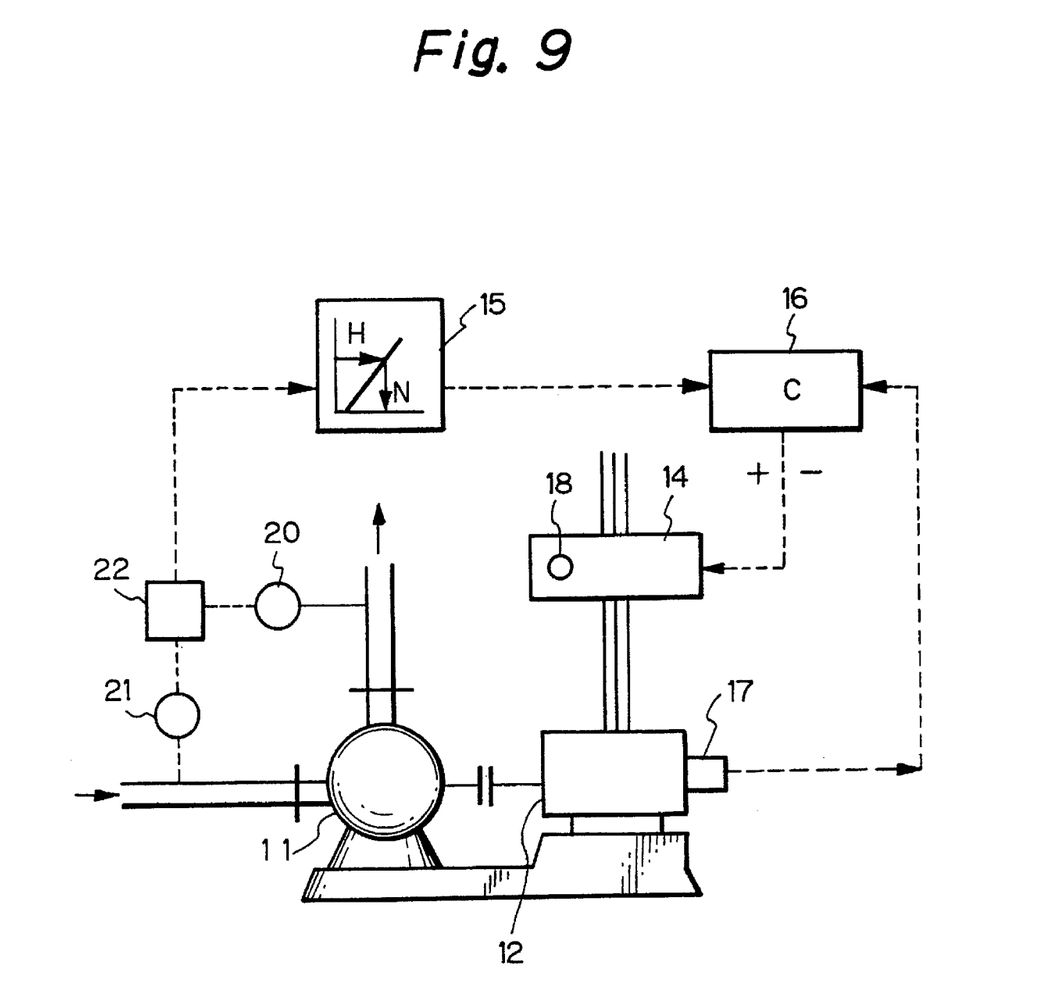
FIG. 9 illustrates the arrangement of a second embodiment of the operation control system according to the present invention.

FIG. 9 illustrates the basic arrangement of a second embodiment of the operation control system according to the present invention in which the invention is applied to a turbo-type low specific speed pump. The pump 11 is a low specific speed centrifugal pump that is used for a relatively high pump head. The pump 11 is driven by a driving machine 12, e.g., an electric motor, a steam turbine, etc. The driving machine 12 has a rotational speed controller 14 for controlling the speed of rotation thereof. The operating head of the pump 11 is detected by an arithmetic unit 22 that obtains a pressure difference through a pressure detector 20 on the discharge side and a pressure detector 21 on the suction side. A function generator 15 is an arithmetic device for outputting a rotational speed n which gives a constant torque in corresponding relation to the operating head H of the pump 11. A rotational speed detector 17 is a device for detecting the speed of rotation of the driving machine 12 and for outputting it in the form of an electrical signal. In a case where the driving machine 12 is an induction motor and the rotational speed controller 14 is a static invertor, an output frequency detector may be used in place of the rotational speed detector 17. A comparator amplifier 16 makes a comparison between the rotational speed signal which is output from the rotational speed detector 17 and the rotational speed signal corresponding to the operating head, which is output from the function generator 15, and outputs deviation of the former rotational speed signal from the latter rotational speed signal to the rotational speed controller 14. The rotational speed controller 14 varies the rotational speed of the driving machine 12 according to the deviation, thereby enabling the pump 11 to be operated with a constant torque irrespective of change in the operating head.

The action and effect of the operation control effected in this embodiment to maintain the torque at a constant value will be explained below. In a case where the driving machine 12 is an induction motor, if a static invertor or the like in which the ratio of frequency to voltage is constant is employed as the rotational speed controller 14, the generated torque corresponding to the motor current value is constant, as is generally known. In general, the rated output of an electric motor is regulated by the value of temperature rise caused by the motor current. Accordingly, by maintaining the torque of the pump at a value corresponding to the rated current value of the motor, it is possible to realize an operation in which the capacity of the electric motor can be exhibited to the full irrespective of change in the operating head or capacity of the pump. In addition, since the electric motor displays the maximum efficiency in the region of the rated current value, it is possible to perform a highly efficient operation at all times.

Figure 10:
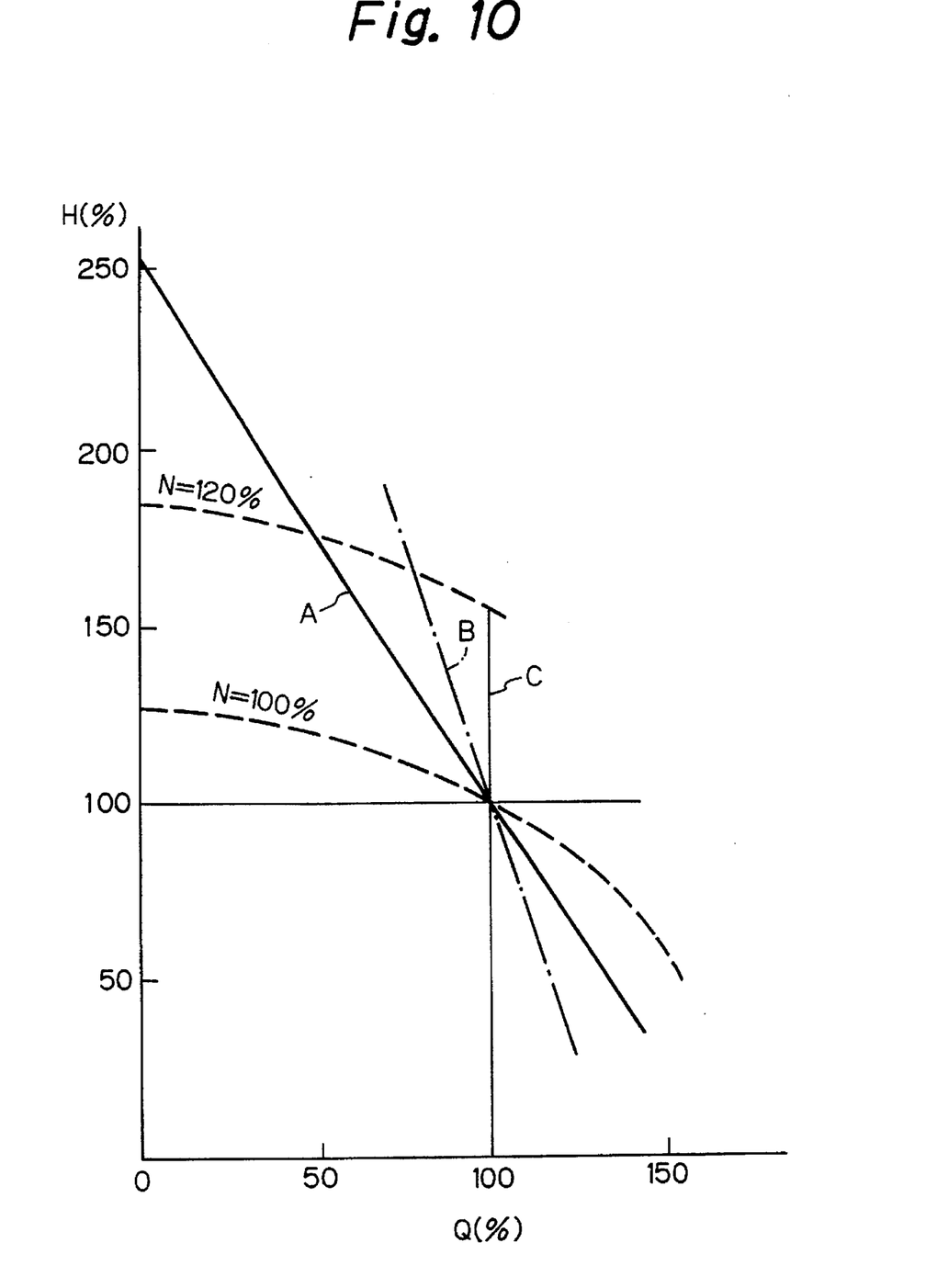
FIG. 10 is a graph showing the relationship between the capacity Q and head H of the pump.
Figure 11:
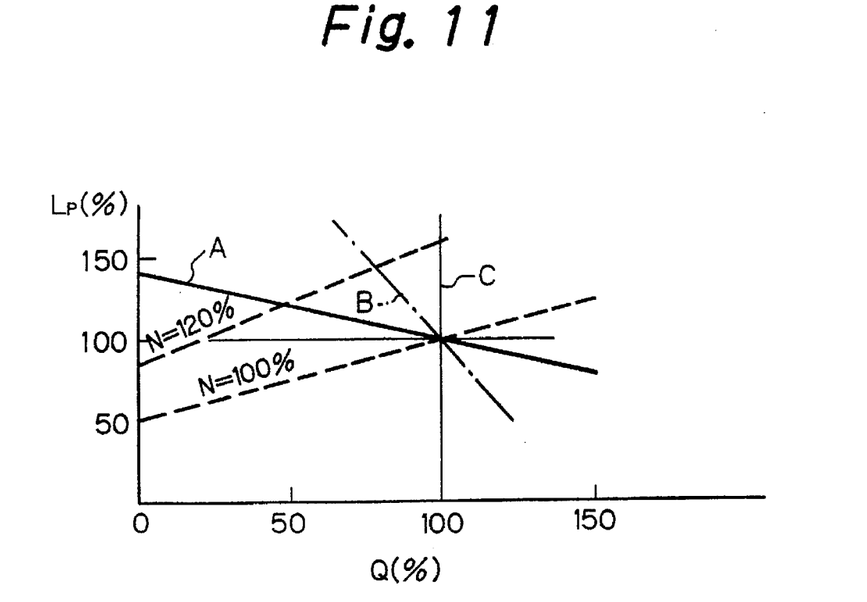
FIG. 11 is a graph showing the relationship between the capacity Q and shaft power Lp of the pump.
Figure 12:
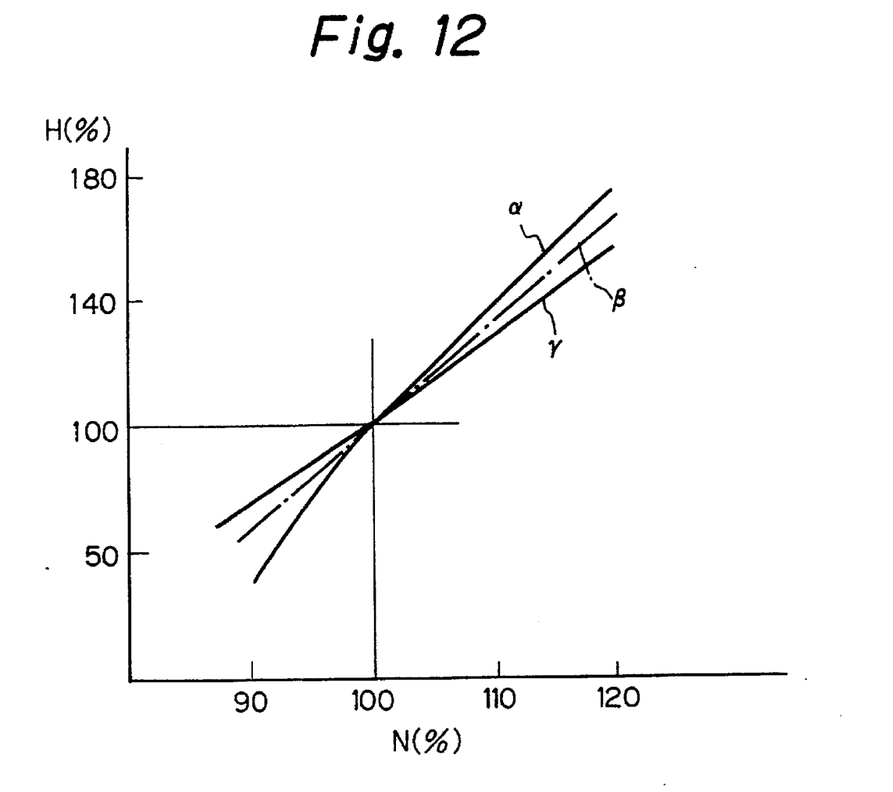
FIG. 12 is a graph showing the relationship between the operating head H of the pump and the rotational speed N that gives a preset pump characteristic.

FIG. 10 shows the relationship between the pump head H and the capacity Q. FIG. 11 shows the relationship between the capacity Q and the shaft power Lp. The dotted lines show the relationships in the case of the conventional operation in which the rotational speed is maintained at a constant value. The solid lines A show the relationships in the second embodiment of the present invention in which the rotational speed is varied with the torque of the driving machine maintained at a constant value. That is, in a low capacity region below the rated capacity (100%), in which the shaft power decreases, the rotational speed is increased, whereas in a high capacity region above the rated capacity, the rotational speed is reduced because the shaft power increases in this region, thereby maintaining the torque at the value of the rated point over the entire range. In a case where the torque is maintained at a constant level, since the rotational speed N is proportional to the shaft power Lp, the relationship between the operating head H and the required rotational speed N can be expressed by the curve α in FIG. 12. By using this relationship, a rotational speed corresponding to the operating head is output from the function generator 15.

According to the present invention, since the torque is maintained at a constant value, the capacity of the driving machine can be effectively utilized. Moreover, since the angle of inclination of the H-Q curve of the pump with respect to the axis Q is large, the change in the capacity Q is remarkably small even when the operating head H shifts up or down from the rated value. Thus, it is possible to realize characteristics favorable for actual use.

In order to protect the driving machine 12 and the pump 11 from an excessive rise in the rotational speed when the operating head is high, a rotational speed upper limit setting device 18 is provided for the rotational speed controller 14 to limit the rotational speed to a predetermined value.

The rotational speed controller 14 can be feedback-controlled by setting in the function generator 15 the rotational speed corresponding to the operating head on the basis of the characteristics of the pump used so that an H-Q curve with a desired slope is realized by using a similar device to the above, and comparing the detected value of rotational speed with the set value. As one example of this control, the function of the relation between the operating head and the rotational speed is shown by the curve β in FIG. 12 in correspondence to the H-Q curve shown by B in FIG. 10.

It is also possible to effect control such that the capacity is maintained at a constant value relative to the operating head. In this case, the H-Q curve of the pump is a straight line C that is at right angles to the axis Q, and the relationship between the operating head and the rotational speed is shown by the curve γ in FIG. 12. In a case where an H-Q curve which is steeper than the H-Q curve denoted by A in FIG. 10 (i.e., the H-Q curve B or C in FIG. 10) is set, it is possible to perform an operation that realizes the H-Q curve set in an expected operating head variable range by previously selecting a rated output of the driving machine used on the basis of the shaft power required when the operating head reaches a maximum.

FIGS. 13 to 16 show a third embodiment of the present invention.

Figure 13:
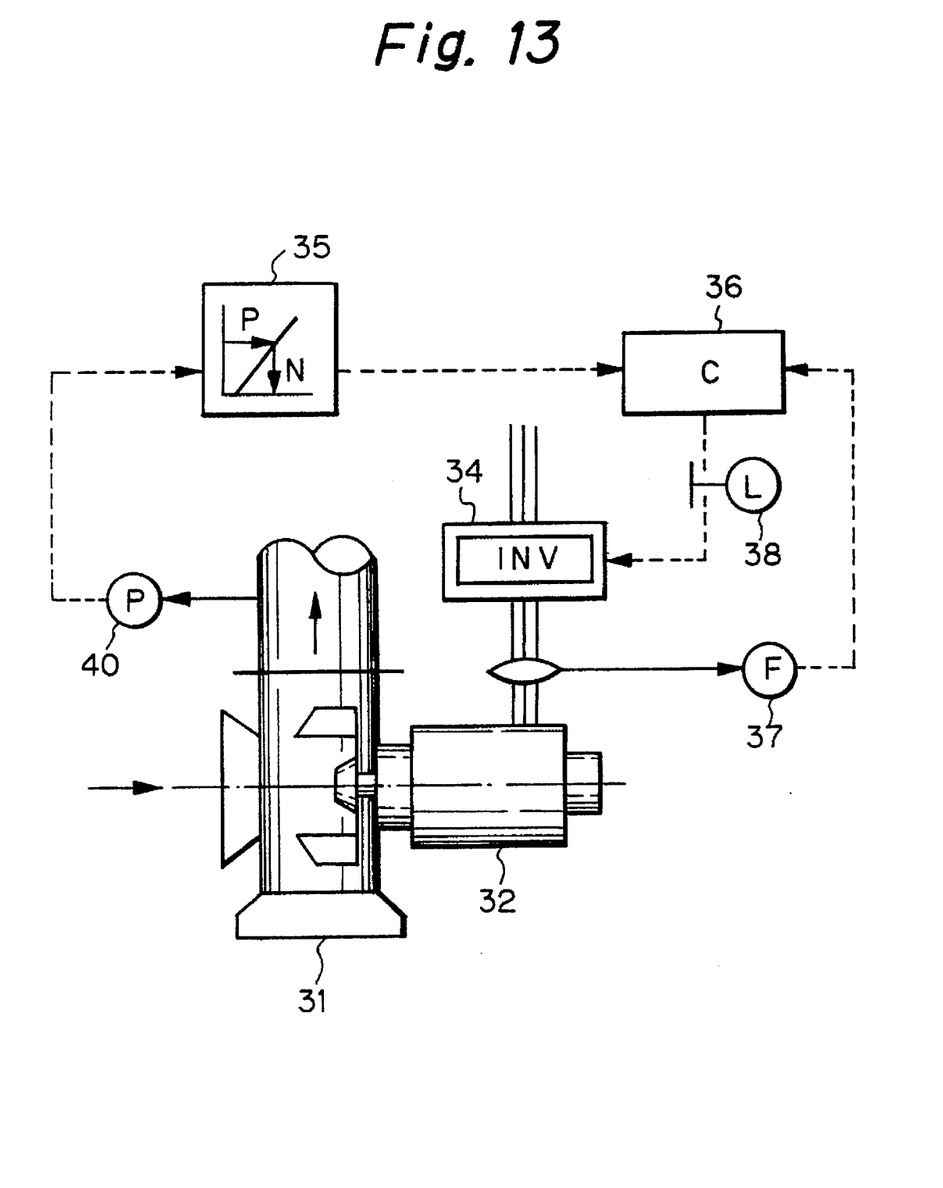
FIG. 13 illustrates the arrangement of a third embodiment of the operation control system according to the present invention.

FIG. 13 illustrates the basic arrangement of a third embodiment of the operation control system according to the present invention in which the invention is applied to a turbo blower. The blower 31 is a turbo blower or fan with radial vanes, which is driven by an induction motor 32. The speed of rotation of the induction motor 32 is controlled by a static invertor 34. The operating pressure of the blower 31 is input as an electric signal to a function generator 35 by a pressure detecting converter 40 on the discharge side of the blower 31. The function generator 35 is an arithmetic device for outputting a rotational speed n which gives a constant torque in corresponding relation to the operating pressure of the blower 31. A frequency detector 37 on the secondary side of the static invertor 34 inputs a signal indicative of the rotational speed of the induction motor 32 to a comparator amplifier 36. The comparator amplifier 36 makes a comparison between the rotational speed n given by the function generator 35 and the actual rotational speed detected by the frequency detector 37 and inputs deviation obtained by the comparison to the frequency varying part of the static invertor 34, thereby controlling the rotational speed of the induction motor 32 so that a constant torque is given irrespective of change in the operating pressure.

In this case, the action and effect of the operation control effected on the motor side are the same as in the case of the second embodiment.

Figure 14:
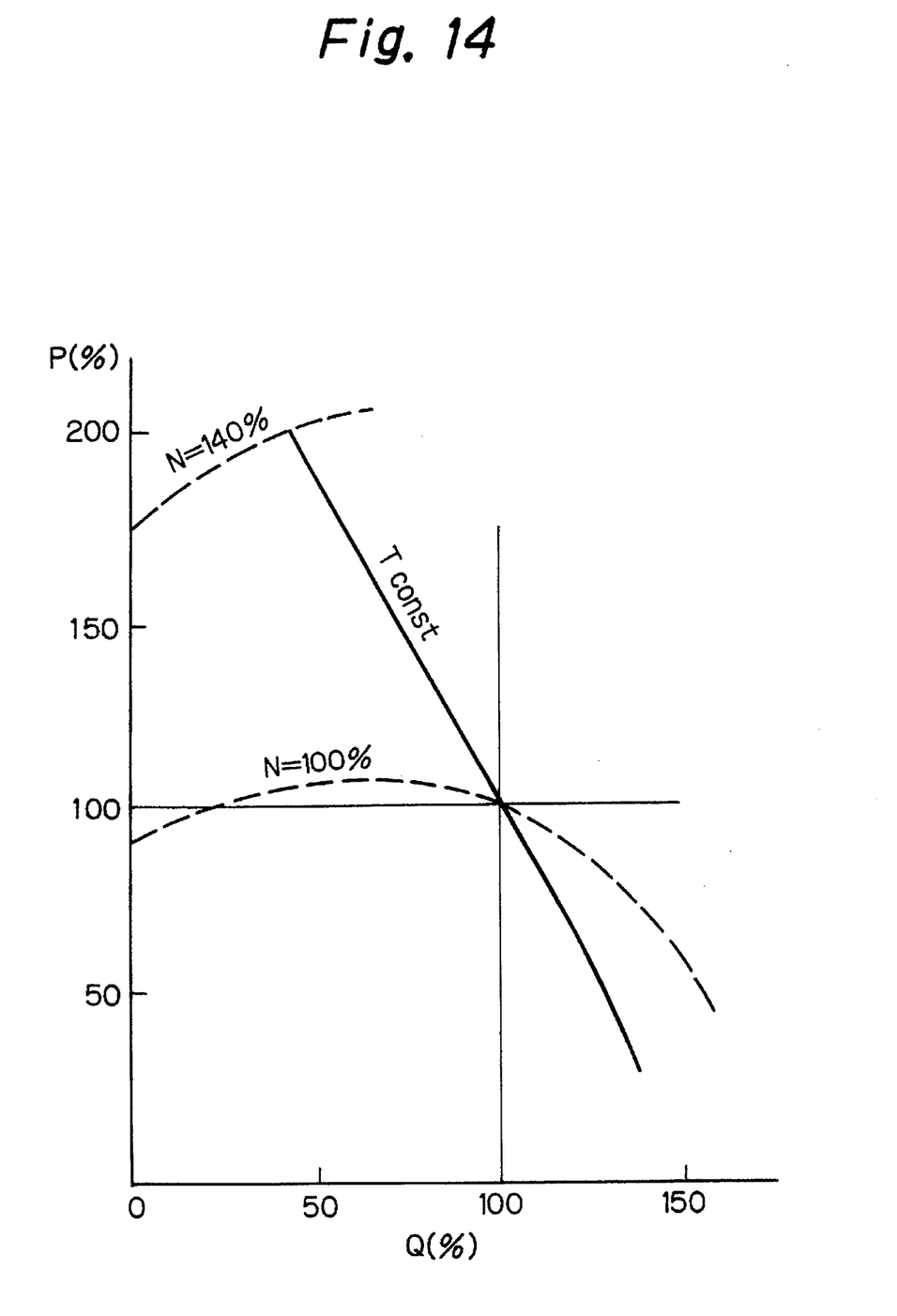
FIG. 14 is a graph showing the relationship between the capacity Q and operating pressure P of a blower.
Figure 15:
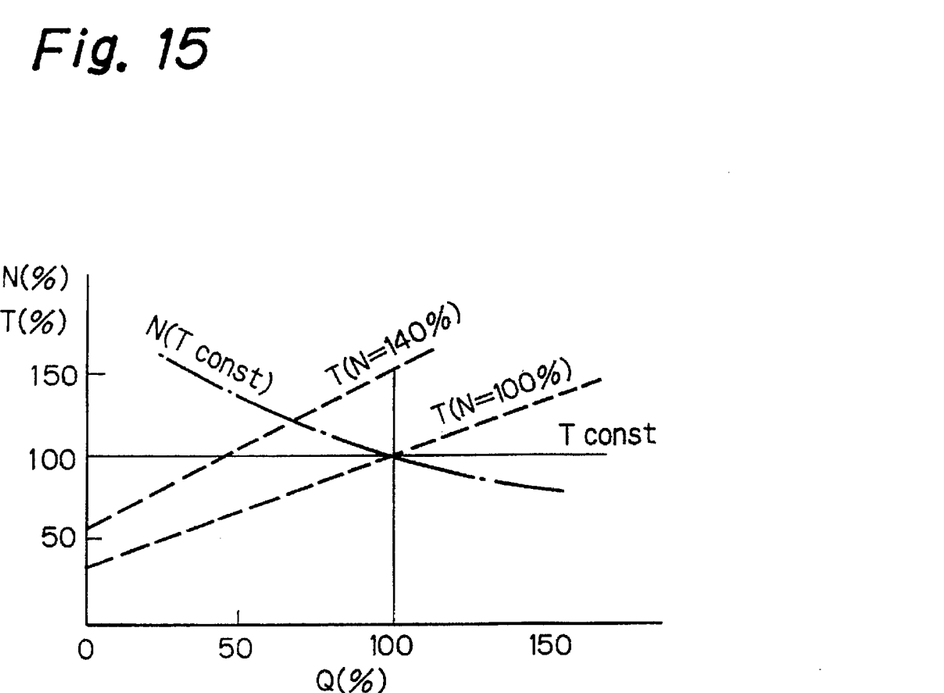
FIG. 15 is a graph showing the relationship between the capacity Q and torque T of the blower.

FIGS. 14 and 15 respectively show the relationships between the operating pressure P and the capacity Q and between the torque T and the capacity Q with the rated point being defined as 100%. The dotted lines show the relationships in the case of an operation performed with the rotational speed maintained at a constant value. The solid lines show the relationships in the third embodiment of the present invention in which the rotational speed is controlled with the torque maintained at a constant value. FIG. 15 also shows the rotational speed N which gives a constant torque in corresponding relation to the capacity Q. The curve N in FIG. 15 shows the rate of change in the motor output with respect to the capacity Q because the shaft power is expressed by the product of the torque T and the rotational speed N. Since the motor current is held constant when the torque is maintained at a constant value, the motor capacity can be utilized to the full at all times irrespective of variation in the operating pressure.

In the case of turbo blowers, the characteristic curve of the operating pressure P relative to the capacity Q often assumes a convex shape with a maximum value around 50% of the rated capacity. In a capacity region below the capacity value at which the pressure P reaches a maximum, surging occurs, making it impossible to perform a stable operation. By carrying out an operation in which the torque is maintained at a constant value with the motor capacity utilized to the full, the characteristic curve of the pressure P relative to the capacity Q becomes a downward sloped curve which is stable over a wide range of operating pressure variations, as shown in FIG. 14. Thus, the surging limit can be excluded from the entire capacity range. In addition, it is possible to suppress markedly the variation in the capacity caused by change of the operating pressure. Thus, characteristics favorable for actual use can be realized.

Figure 16:
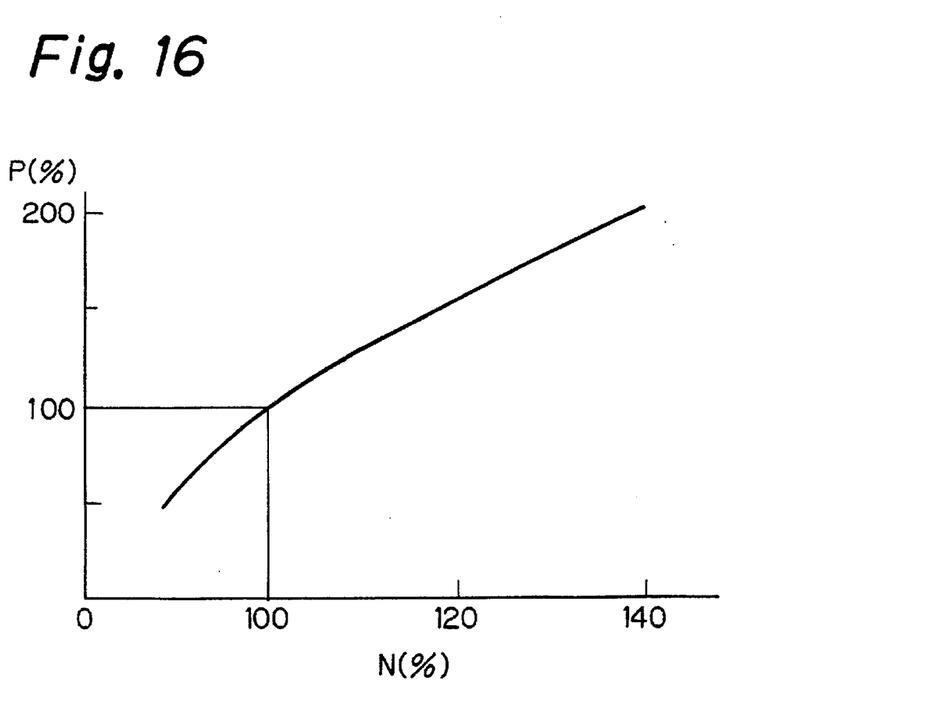
FIG. 16 is a graph showing the relationship between the operating pressure P of the blower and the rotational speed N that gives a constant torque.

FIG. 16 shows the relationship between the operating pressure, which is obtained by using the relationship between the torque and the rotational speed obtained from the equation (1), and the rotational speed that gives a constant torque. The relationship shown in the figure is set in the function generator 35. An excessive rise in the rotational speed caused by the rise in the operating pressure is avoided by a rotational speed upper limit setting device 38. It is also possible to set the relationship between the operating pressure and the rotational speed in the function generator 35 so that a desired slope is given to the characteristic curve of the discharge pressure P relative to the capacity Q on the basis of the characteristics of the blower 31.

As has been described above, the present invention provides the following advantages: In a turbo-type fluid machine that is driven by a prime mover provided with a speed governor or a rotational speed controller, it is possible to realize performance characteristics favorable for actual use by detecting only the operating head or the operating pressure, which is readily measurable. In other words, it becomes possible to operate the turbo fluid type machine with the output of the prime mover utilized to the maximum while maintaining the efficiency of the prime mover in the vicinity of the maximum value at all times by maintaining the torque at a constant value irrespective of variation in the operating head or pressure. In addition, it is possible to improve markedly the performance characteristics of the fluid machine, e.g., the relationship between the operating head or pressure and the capacity. Thus, the present invention is widely applicable to turbo-type pumps, blowers, etc. which are driven by various variable speed prime movers.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A turbo-type fluid machine operation control system comprising:

a turbo-type fluid machine driven by a driving machine;

means for detecting an operating head or operating pressure of said fluid machine;

means for arithmetically outputting a rotational speed which produces a preset constant torque of said fluid machine to permit use of all of the capacity of said driving machine in corresponding relation to said operating head or operating pressure;

means for changing a rotational speed of said driving machine in response to said arithmetically outputted rotational speed, so that even when the operating head or operating pressure of said fluid machine changes, a rotational speed of said fluid machine is controlled so as to maintain the preset constant torque, such that, for a high specific speed fluid machine, when the operating head or pressure is below a rated value, the rotational speed increases and pump capacity increases, and when the operating head or pressure is above the rated value, the rotational speed decreases and pump capacity decreases, to avoid overloading the driving machine; and means for providing an upper limit for a set rotational speed value given to said means for changing a rotational speed of said driving machine to limit the rotational speed of said driving machine and said fluid machine within a predetermined value.

2. A turbo-type fluid machine operation control system according to claim 1, wherein said means for arithmetically outputting a rotational speed includes a function generator, a detector for detecting a rotational speed of said fluid machine and a comparator amplifier.

3. A turbo-type fluid machine operation control system according to claim 1, wherein said driving machine is an internal combustion engine, a gas turbine, or a steam turbine and said means for changing a rotational speed of said driving machine comprises a speed governor.

4. A turbo-type fluid machine operation control system according to claim 1, wherein said driving machine is an electric motor, and said means for changing a rotational speed of said driving machine comprises a rotational speed controller.

5. A turbo-type fluid machine operation control system according to claim 4, wherein said rotational speed controller comprises a frequency-voltage converter.

6. A method for controlling a turbo-type fluid machine driven by an internal combustion engine comprising the steps of:

detecting an operation head or operating pressure of said fluid machine;

arithmetically outputting a rotational speed which gives a constant torque of said fluid machine in corresponding relation to said operating head or operating pressure to permit use of all of the capacity of said internal combustion engine;

changing a rotational speed of said internal combustion engine in response to said arithmetically output rotational speed, so that even when said operating head or operating pressure of said fluid machine changes, a rotational speed of said fluid machine is controlled so as to maintain said constant torque, such that, for a high specific speed fluid machine, when the operating head or pressure is below a rated value, the rotational speed increases and pump capacity increases, and when the operating head or pressure is above the rated value, the rotational speed decreases and pump capacity decreases, to avoid overloading said internal combustion engine; and limiting the rotational speed of said fluid machine within a predetermined value.

7. A method for controlling a turbo-type fluid machine as recited in claim 6, wherein an upper limit is provide for limiting the rotational speed of said fluid machine within said predetermined value.

* * * * *